United States Patent [19]

Kawachi et al.

[11] Patent Number: 4,793,847
[45] Date of Patent: Dec. 27, 1988

[54] APPARATUS FOR DISTRIBUTING GOBS IN BOTTLE MAKING MACHINE

[75] Inventors: Fumio Kawachi; Masatada Nakasima; Kazuo Komatsu, all of Ogaki, Japan

[73] Assignee: Nihon Taisanbin Kogyo Kabushiki Kaisha, Gifu, Japan

[21] Appl. No.: 113,699

[22] Filed: Oct. 28, 1987

[30] Foreign Application Priority Data

Dec. 27, 1986 [JP] Japan .................................. 61-315746

[51] Int. Cl.⁴ ............................................. C03B 7/14
[52] U.S. Cl. ...................................... 65/225; 65/303; 65/304
[58] Field of Search ............... 65/207, 225, 303, 304; 193/14, 23

[56] References Cited

U.S. PATENT DOCUMENTS 3,147,102 9/1964 Trudeau .................................. 65/304
3,775,083 11/1973 Nebelung et al. ..................... 65/304
4,379,715 4/1983 Garza ...................................... 65/304

FOREIGN PATENT DOCUMENTS 1266975 3/1972 United Kingdom ................. 65/304

Primary Examiner—Robert L. Lindsay
Attorney, Agent, or Firm—Armstrong, Nikaido, Marmelstein & Kubovcik

[57] ABSTRACT

A gob distributing apparatus having a gob feeder, a scoop for selectively connecting the feeder to desired immovable chutes of a bottle making machine, and an actuator of the scoop. The scoop has rollers which are provided on the scoop and a rotatable spiral cam which is engaged by the rollers, so that the rotation of the cam causes the scoop to rotate in order to selectively connect the chutes and the feeder.

2 Claims, 2 Drawing Sheets

APPARATUS FOR DISTRIBUTING GOBS IN BOTTLE MAKING MACHINE

BACKGROUND OF THE INVENTION

1. Field of the Invention

The present invention relates to an apparatus for distributing gobs, and more precisely it relates to an improved apparatus for actuating a scoop in a gob distributing apparatus.

2. Description of the Related Art

Generally speaking, a bottle making machine has a feeder which feeds gobs (raw materials of gobs of glass) and a gob forming machine which usually has about eight working sections to receive the gobs from the feeder.

A gob distributing apparatus to which the subject of the present invention is directed has an archwise scoop which is located below the feeder to receive the gobs and which is rotated within a predetermined angular displacement to selectively connect stationary chutes which are provided in the working sections in a concentrical arrangement to the feeder so as to distribute and feed the gobs to the working sections in a predetermined order.

In a conventional gob distributing apparatus, an actuator for rotating the scoop has a worm wheel which lies in a horizontal plane and which is provided on an outer periphery of a vertical shaft portion thereof which is rotatably supported by a body of the apparatus, and a worm which meshes with the worm wheel and which is driven by a servo-motor.

However, the worm has, as is well known, a drawback that it has a large sliding speed of a contact surface thereof, resulting in a large friction loss. Accordingly, the worm needs a powerful large drive. Furthermore, due to a frictional wear of the contact surface of the worm, a positional deviation tends to occur between the worm and worm wheel, resulting in a decreased endurance.

There is also known a gob distributing apparatus which has an annular spur gear which is provided on an outer periphery of the vertical shaft portion which is rotatably supported by the apparatus body and which lies in a horizontal plane, and a rod with a rack which engages with the spur gear. The rod reciprocally moves in a direction of the length thereof to actuate the scoop. The rod has at its one end a threaded nut in which a threaded shaft is screwed. The threaded shaft is connected to a servo-motor, so that the rod can be reciprocally moved by the servo-motor through the threaded shaft.

In this known apparatus, the drive can be made small and the possibility of a positional deviation between the spur gear and the rack can be decreased due to a small contact surface between the spur gear and the rack and only a small drive power is needed, in comparison with the first mentioned known apparatus having a worm and a worm wheel.

However, the second known apparatus needs a relatively complex mechanism for converting the rotational movement of the servo-motor to the reciprocal movement of the rod, and a ball screw or the like for ensuring a linear movement of the rack, resulting in a large and expensive apparatus.

SUMMARY OF THE INVENTION

The primary object of the present invention is, therefore, to provide a simple and small gob distributing apparatus in a bottle making machine in which a scoop can be easily and accurately controlled.

In order to achieve the object mentioned above, according to the present invention, there is provided an apparatus for distributing gobs, having a feeder which feeds the gobs and a scoop which is actuated to distribute the gobs to desired chutes in a predetermined order, wherein said scoop has a vertical shaft portion which is rotatably supported by a body of the apparatus and which is provided, on its outer periphery, with a plurality of rollers located in a concentrical arrangement, and wherein the apparatus comprises a cylindrical cam which has a spiral projection or groove which is engaged by the rollers, said cam being connected to a servo-motor and being perpendicular to the vertical shaft portion.

With this arrangement, when the cylindrical cam is rotated by the servo-motor, the rollers roll on a spiral cam surface provided by the spiral projection or groove of the cam. The movement of the rollers on and along the spiral cam surface causes a rotational movement of the vertical shaft portion of the scoop to bring the scoop to a desired angular position.

BRIEF DESCRIPTION OF THE DRAWINGS

The invention will be described below in detail, with reference to the accompanying drawings, in which.

DESCRIPTION OF THE PREFERRED EMBODIMENTS

Figure 1:
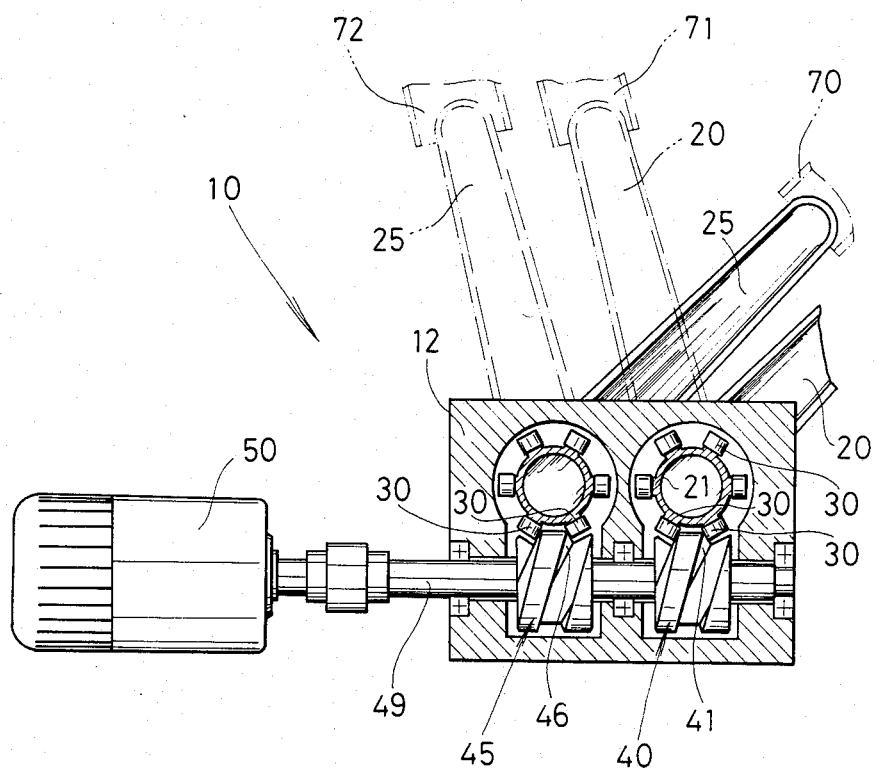
FIG. 1 is a partial sectional plan view of a gob distributing apparatus according to the present invention.
Figure 2:
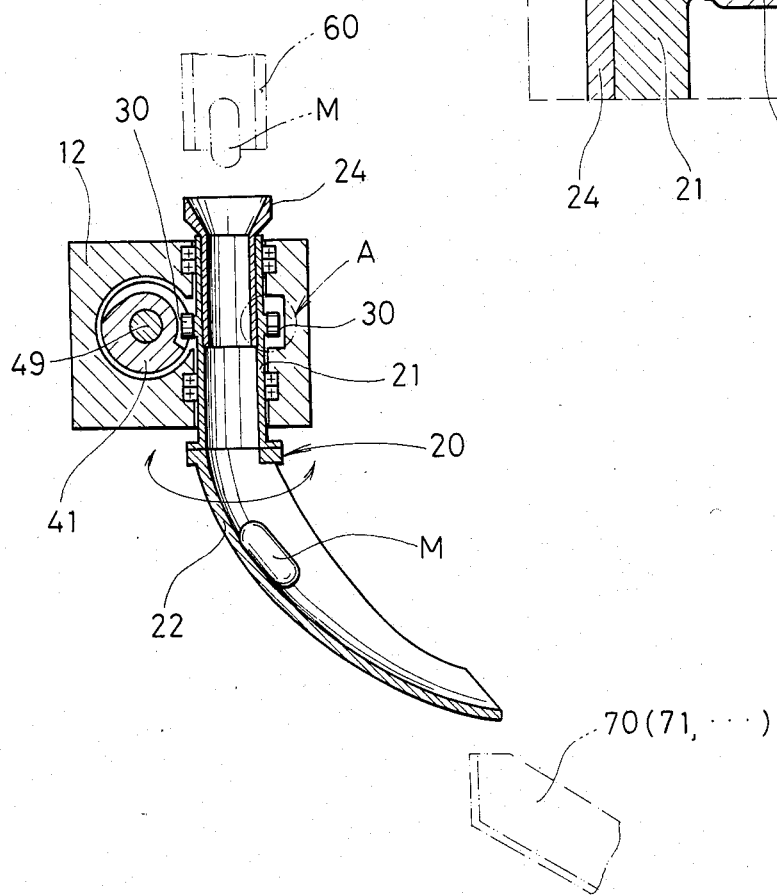
FIG. 2 is a sectional side view of FIG. 1.

The gob distributing apparatus of the invention which is generally shown at 10 in FIGS. 1 and 2 can form two bottles at one time and accordingly has a pair of scoops 20 and 25, and a pair of cylindrical cams 40 and 45 which are connected to a common servo-motor 50. It goes, however, without saying that the gob distributing apparatus essentially can have only one scoop and only one cylindrical cam to form one bottle at one time to achieve the object of the present invnetion.

The gobs M which are successively discharged by a feeder 60 are received by the scoops 20 and 25 which can be rotated by an actuator which will be described hereinafter to distribute the gobs to desired chutes 70, 71, 72 . . . of desired working sections. The chutes which are immovable are located in a concentrical arrangement.

As can be seen in FIG. 2, the scoop 20 has a vertical shaft portion 21 which is rotatably supported in a body 12 of the apparatus. The scoop 20 has, at its lower end, an archwise distributing portion 22. The numeral 24 designates a funnel for certainly receiving the gobs M.

A plurality of rollers 30 are provided on the outer periphery of the vertical shaft portion 21 in a concentrical arrangement. The rollers 30 are spaced from each other in a circumferential direction of the vertical shaft portion 21.

Figure 3:
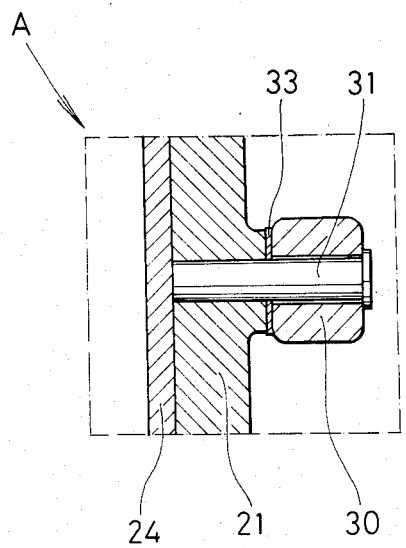
FIG. 3 is an enlarged view of a portion A in FIG. 2.

As can be seen from FIG. 3, the rollers 30 are rotatably supported on and by shafts 31 which are secured to the vertical shaft portion 21 of the scoop 20 and which extend perpendicularly to the vertical shaft portion 21.

The numeral 33 designates a washer between the roller 30 and the vertical portion 21.

The foregoing discussion directed to the scoop 20 is also applicable to the scoop 25.

The actuator for rotating the scoop 20(25) has a cylindrical cam 40(45) which has a spiral projection 41(46) forming a cam surface which can be engaged by the rollers 30, so that the rollers 30 roll on and along the spiral projection 41(46). The cams 40 and 45 are secured to a common rotational cam shaft 49 which is connected to the servo-motor 50 and which extends perpendicularly to the vertical shaft portion 21 of the scoop 20(25). The spiral projection 41(46) can be replaced with a spiral groove in which the rollers are engaged.

As can be understood from the drawings, according to the present invention, the opposite side faces (cam surfaces) of each turn of the spiral projection 41(46) are held by two rollers 30, 30, and accordingly a backlash between the cylindrical cams and the rollers can be minimized.

The servo-motor 50 properly controls the rotation of the rotational cam shaft 49, in accordance with a cam profile of the spiral projections (grooves) 41 and 46, the angular distance between the rollers 30, the position of the stationary chutes 70, 71 . . . , the sequence of the gob forming operation, the operational speed, etc.

The control per se is well known and the present invention is not directed to the control method.

As can be understood from the above discussion, according to the present invention, the cooperation of the cylindrical cam(cams) having a spiral projection(s) or groove(s) and the rollers provided on the outer periphery of the scoop(s) enables the scoop(s) to smoothly rotate with a small drive force. Furthermore, according to the present invention, the drawbacks of the prior art that a large drive motor is needed, an endurance is decreased due to the frictional wear, and a positional deviation tends to occur, etc. as mentioned above can be eliminated.

In addition to the foregoing, according to the present invention, no complex mechanism for converting the direction of the movement is necessary, unlike the prior art in which the rack and pinion mechanism is used as mentioned above.

According to the present invention, requirements of a high precision control of the scoop and a realization of a small and compact distributing apparatus can be satisfied.

We claim:

1. An apparatus for distributing gobs which are fed from a feeder to plural desired immovable chutes of a bottle making machine, said apparatus comprising:
   a body,
   plural rotatably scoops, each scoop having vertical shaft portion having a center axis, an archwise distributing portion at a lower end of said vertical shaft portion, and a funnel mounted on an upper end of said vertical shaft portion, each vertical shaft portion being rotatably supported in said body for rotation about said center axis to selectively connect the feeder to the chutes,
   plural shafts radially extending from each vertical shaft portion of each rotatable scoop, said shafts being spaced from each other in a circumferential direction of said vertical shaft portion and extending perpendicular to said center axis in a horizontal plane,
   plural rollers each rotatably supported on and by one of said plural shafts,
   a cam shaft rotatably supported in said body lying in said horizontal plane,
   a servo motor directly connected to said cam shaft for rotating said cam shaft, and
   plural cylindrical cams, one for each rotatable scoop, secured to said cam shaft, each cam having a spiral cam surface rollingly engaged by said rollers of the respective rotatable scoop.

2. An apparatus as claimed in claim 1, wherein said spiral cam surface of each cam is formed by a spiral projection on said cylindrical cam, and two rollers of the respective rotatable scoop engage opposite side surfaces of said spiral projection whereby backlash between the cam and the rollers can be minimized.

* * * * *